Feb. 15, 1927.  1,617,445
J. E. GLEASON ET AL
METHOD OF PRODUCING GEAR TEETH
Filed Sept. 5, 1924
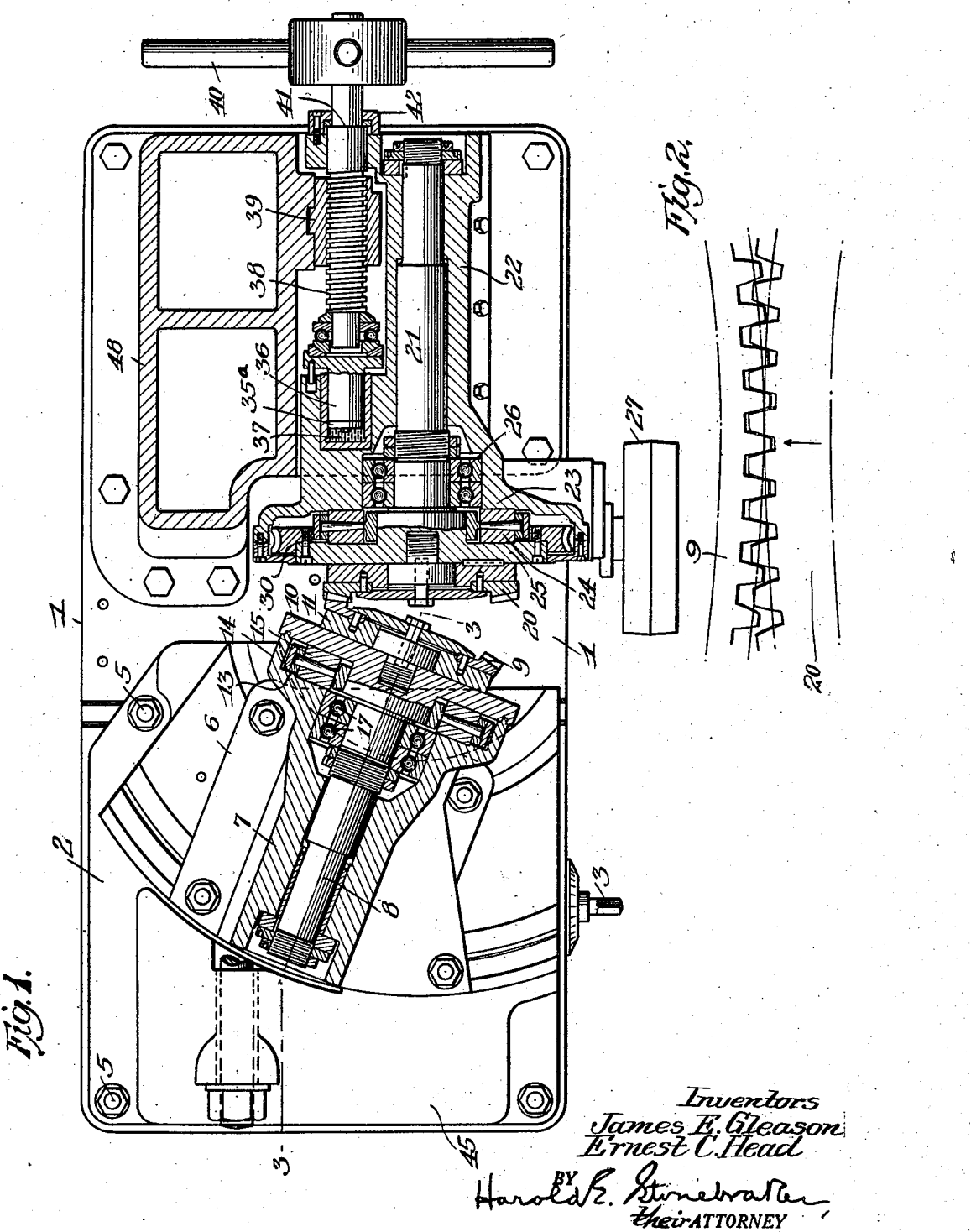
Inventors
James E. Gleason
Ernest C. Head
BY Harold E. Stonebraker
their ATTORNEY Patented Feb. 15, 1927.

1,617,445

UNITED STATES PATENT OFFICE.

JAMES E. GLEASON AND ERNEST C. HEAD, OF ROCHESTER, NEW YORK, ASSIGNORS TO GLEASON WORKS, OF ROCHESTER, NEW YORK, A CORPORATION OF NEW YORK.

METHOD OF PRODUCING GEAR TEETH.

Application filed September 5, 1924. Serial No. 736,100.

The invention relates to a method for producing gear teeth, with more particular reference to gears cut according to what is generally known as a generating process.

One purpose of the invention is to produce a gear with tooth surfaces as nearly accurate as possible, and with maximum smoothness and uniformity so as to afford quiet running qualities.

The invention has for a further object to afford a method for treating gears so as to reduce to a minimum such imperfections as may exist on the tooth surfaces of generated gears, and also to increase the strength of the teeth.

Still another purpose of the invention is to eliminate flats, high spots, tool marks or other irregularities of the tooth surfaces of a gear by rolling a toothed blank in engagement with a perfect master gear, and applying considerable pressure to force the master gear and blank together, so as to roll or press out the imperfections of the tooth surfaces on the blank until it conforms exactly to the master gear.

An additional object of the invention is to insure obtaining correct tooth surfaces, by generating a blank with slightly oversize teeth, and then rolling the blank while cold and under pressure with a master gear of the required size, to compress the teeth on the blank until they acquire the size and conform to the teeth on the master.

In the drawings:

Fig. 1 is a horizontal sectional view of a machine such as may be used for carrying out the process, and arranged for operation on a bevel gear blank.

Fig. 2 is a diagrammatic view showing the relative engagement between the blank and master gear.

The invention may be carried out in a variety of ways, and the machine herein disclosed is intended merely as an illustrative example of commercial arrangements for practicing the method involved. While the structure herein set forth relates to curved tooth bevel gears, other types of gears such as spur gears and straight toothed gears can be produced according to the invention with equal advantage.

Referring to Figure 1, 1 designates a bed on which is mounted a base 2 which is adjustable across the bed by means of the screw 3 engaging a nut 4 carried by the base, while 5 designates securing bolts co-operating with the bed and base and serving to hold the base in position after it is once adjusted. By this means, the blank spindle is adjustable bodily in a direction at right angles to the axis of the master gear, to obtain the required pressure angle adjustment of the blank.

6 designates a table that is angularly adjustable on base 2, and is provided with a support or housing 7 for the spindle 8 upon which the gear blank 9 is mounted, by which the proper pitch angle adjustment between the master gear and blank is obtained. Spindle 8 is provided with a head 10 fixed thereon, the blank being mounted on a ring 11 and clamped against said head 10 by means of plate 12.

The gear blank 9 and spindle 8 are driven entirely by engagement of the blank with the master gear, insuring maintaining a proper and accurate relationship between the master gear and blank without back lash.

20 designates the master gear arranged for rolling engagement with the gear blank 9 and mounted upon spindle 21. The spindle 21 is arranged within a support or housing 22, which includes the end face 23, while 24 are anti-friction roller bearings arranged between the end face 23, and the head 25 on spindle 22, the master gear 20 being clamped against head 25. Roller bearings 24 receive the axial thrust of spindle 21 while 26 are anti-friction ball bearings surrounding spindle 21 to receive the radial thrusts thereof.

The spindle 21 is driven from a power pulley 27 through a worm that engages worm gear 30.

35ª designates a cylinder provided on the support 22, and 36 is a piston movable in said cylinder, the piston acting to move the cylinder 35ª and the support 22 through a cushioning medium preferably in the form of a body of liquid 37 such as oil. The piston 36 is connected to an operating screw 38 which turns in a stationary nut 39 and is provided at its outer end with the operating hand wheel 40. By turning the hand wheel 40 and screw 38, piston 36 acts through a body of oil 37 to force the support 22 and spindle 21 with the master gear 20 toward the gear blank during a rolling operation, so as to move the tops of the teeth on the master gear toward the bottoms of the spaces on the blank. To withdraw the master gear, the hand wheel 40 is turned in the opposite direction whereupon the shoulder 41 on screw 38 engages a collar 42 that is fixed to support 22, thus withdrawing the support and the master gear away from the blank.

The master gear is actuated toward the blank, during rolling, under high pressure which may vary from one to fifteen tons. Best results have thus far been obtained with from five to seven tons. The master ger is made as nearly perfect as possible, and the blank is rolled, while cold, and under pressure such as described, with the perfect master until the pitch circles or cones of the two gears are tangential.

Preferably, the blank is made with teeth slightly thicker than required in the finished product. This additional thickness or oversize on the teeth of the blank which may be from two to five thousandths of an inch, is pressed or rolled in by the master gear. This action reduces the teeth on the blank to the final required thickness and eliminates the imperfections or irregularities of the tooth surfaces on the blank, causing the latter finally to conform to the teeth on the master gear.

The desired result can be obtained by having the teeth on the master gear slightly thinner than those on the blank or in other ways, and while I have described a mechanism in which power is applied to the master gear and the latter is forced toward the blank under pressure, equally efficient results can be had by otherwise effecting a rolling and simultaneous relative pressure between the master gear and blank. The effect of the pressure between the master gear and blank is to compress the metal of the tooth surfaces of the blank and to impart to the tooth surfaces a smooth, uniform, and accurate curvature which will accord more closely with a theoretically correct generated tooth than the usual tooth made by a cutting process.

The operation of the machine briefly is as follows: The blank is secured on its spindle and its support adjusted until the proper pitch and pressure angle relations with the master gear are obtained. Power then is applied to pulley 27, causing the master gear to rotate and to turn the gear blank. Thereupon the operator turns the hand wheel 40, or in any other suitable way moves the master gear support toward the gear blank under considerable pressure of from two to fifteen tons for instance, thus forcing the tops of the teeth on the master toward the bottoms of the spaces on the blank as illustrated in Fig. 2. Where the blank is oversize, rolling is continued and additional pressure applied in successive operations until the master gear and blank are at the proper depth of engagement or preferably until their pitch circles or cones are in contact.

When this point of engagement is reached, the blank will have been reduced to the size and shape of the master which is then withdrawn. Preferably, the operation is performed on a blank which is first cut by a generating process, although the blank may be formed in some other manner, and after the cold rolling operation described, the blank is case hardened and ready for use. Owing to rolling and pressing the tooth surfaces while the metal is cold, no distortion of the tooth surfaces occurs when the blank is heated for hardening and as a result, the final gear possesses tooth surfaces which have a smoothness, uniformity, and accuracy, that is substantially and closely in accordance with the degree of perfection of the master gear.

We claim:

1. The method of making a gear which consists in cutting teeth slightly thicker than required in the final gear, and reducing the teeth to the desired thickness by rolling the toothed blank while cold with a master gear under high pressure to shape the teeth on the blank while cold.

2. The method of making a gear which consists in cutting teeth on a blank, and rolling the toothed blank while cold and under high pressure to shape the teeth with a master gear having teeth of slightly less thickness than those on the blank and spaces of slightly greater width than the spaces on the blank.

3. The method of making a gear which consists in cutting teeth on a blank by a generating process, each tooth being cut slightly thicker than required in the final gear, and reducing the teeth to the desired thickness by rolling the generated blank while cold with a master gear under high pressure.

4. The method of making a gear which consists in cutting teeth on a blank by a generating process, and rolling the blank while cold and under high pressure with a master gear having teeth of slightly less thickness than those on the blank and spaces of slightly greater width than those on the blank.

5. The method of making a gear which consists in cutting a toothed blank and then rolling it while cold with a master gear and simultaneously applying high pressure to force the teeth on one member toward the bottoms of the spaces on the opposite member and shape the teeth while cold.

6. The method of making a gear which consists in cutting teeth on a blank by a generating process, rolling the generated gear while cold with a master gear, and simultaneously applying high pressure to force the teeth on one member toward the bottoms of the spaces on the opposite member.

7. The method of making a curved tooth gear which consists in cutting a toothed blank and then rolling it while cold with a master gear and simultaneously applying high pressure to force the teeth on one member toward the bottoms of the spaces on the opposite member and shape the teeth while cold.

8. The method of making a curved tooth gear which consists in cutting teeth on a blank by a generating process, rolling the generated gear while cold with a master gear, and simultaneously applying high pressure to force the teeth on one member toward the bottoms of the spaces on the opposite member.

9. The method of making a gear which consists in cutting a toothed blank and then rolling it while cold with a master gear and simultaneously applying from one to fifteen tons pressure acting to force the teeth on one member toward the bottoms of the spaces on the opposite member and shape the teeth.

10. The method of making a curved tooth gear which consists in cutting a toothed blank and then rolling it while cold with a master gear and simultaneously applying from one to fifteen tons pressure acting to force the teeth on one member toward the bottoms of the spaces on the opposite member and shape the teeth.

11. The method of making a gear which consists in cutting teeth in a blank by a generating process, rolling the generated blank while cold with a master gear, and simultaneously applying from one to fifteen tons pressure acting to force the teeth on one member toward the bottoms of the spaces on the opposite member.

12. The method of making a curved tooth gear which consists in cutting teeth on a blank by a generating process, rolling the generated blank while cold with a master gear, and simultaneously applying from one to fifteen tons pressure acting to force the teeth on one member toward the bottoms of the spaces on the opposite member.

13. The method of producing a gear which consists in cutting a blank by a generating process, rolling the cut blank while cold with a master gear and applying considerable relative pressure between the master gear and blank, and subsequently case hardening the blank.

14. The method of producing a gear which consists in cutting a blank by a generating process, each tooth being cut slightly thicker than required in the finished gear, reducing the teeth to required thickness by rolling the blank while cold under high pressure with a master gear, and then case hardening the blank.

15. The method of producing a gear which consists in rolling a toothed blank while cold and under high pressure with a master gear having teeth slightly thinner than the teeth on the blank until the teeth on the blank are of the same thickness as those on the master gear, and then case hardening the blank.

In witness whereof, we have hereunto signed our names.

JAMES E. GLEASON.
ERNEST C. HEAD.